(12) United States Patent
Bernath et al.

(10) Patent No.: US 7,551,267 B2
(45) Date of Patent: Jun. 23, 2009

(54) SYSTEMS AND METHODS FOR MEASURING ULTRA-SHORT LIGHT PULSES

(75) Inventors: Robert Bernath, Orlando, FL (US);
Martin Richardson, Geneva, FL (US);
Joshua Duncan, Oviedo, FL (US);
Michael Hemmer, Orlando, FL (US);
Timothy McComb, Orlando, FL (US);
Etienne Puyoo, St. Paul les Dax (FR)

(73) Assignee: University of Central Florida Research Foundation, Inc., Orlando, FL (US)

( * ) Notice: Subject to any disclaimer, the term of this patent is extended or adjusted under 35 U.S.C. 154(b) by 296 days.

(21) Appl. No.: 11/789,177

(22) Filed: Apr. 24, 2007

(65) Prior Publication Data

US 2008/0266543 A1 Oct. 30, 2008

(51) Int. Cl.
*G01C 3/08* (2006.01)
*G01B 9/02* (2006.01)
(52) U.S. Cl. .................. 356/5.01; 356/491; 356/256
(58) Field of Classification Search ............. 356/4.01, 356/5.01, 491, 256
See application file for complete search history.

(56) References Cited

U.S. PATENT DOCUMENTS

| | | | | |
|---|---|---|---|---|
| 5,007,717 A | * | 4/1991 | Cutolo et al. | 359/328 |
| 5,299,170 A | * | 3/1994 | Shibata et al. | 356/491 |
| 5,585,913 A | * | 12/1996 | Hariharan et al. | 356/4.09 |
| 6,504,612 B2 | * | 1/2003 | Trebino | 356/450 |
| 6,686,997 B1 | * | 2/2004 | Allen | 356/256 |
| 7,046,365 B1 | * | 5/2006 | Aoshima et al. | 356/450 |

OTHER PUBLICATIONS

Reid et al., "Light-emitting diodes as measurement devices for femtosecond laser pulses," Opt. Lett., vol. 22 No. 4, Feb. 15, 1997, pp. 233-235.
Yeh, "Autocorrelation of ultrashort optical pulses using polarization interferometry," Opt. Lett., vol. 8 No. 6 Jun. 1983, pp. 33-332.

(Continued)

*Primary Examiner*—Isam Alsomiri
(74) *Attorney, Agent, or Firm*—Opticus IP Law PLLC

(57) ABSTRACT

Systems and methods for measuring a pulse length ($\tau_0$) of an ultra-short light pulse ($P_0$) based on processing a number of substantially similar light pulses. The system includes an autocorrelation optical system adapted to receive the light pulses $P_0$ and create from each light pulse two beams having an associated optical path length difference $\Delta OPL$. Providing a different $\Delta OPL$ for each light pulse creates an autocorrelation interference pattern representative of an autocorrelation of the light pulse $P_0$. An LED detector detects the autocorrelation interference pattern and generates therefrom an autocorrelation signal. A signal-processing unit forms from the autocorrelation signal a digital count signal representative of a number of counted peaks in the autocorrelation signal above the full-width half maximum. Control electronics unit causes the varying $\Delta OPL$ and provides a difference signal ($S_A$) representative of the $\Delta OPL$ to the signal-processing unit. The signal processing unit is adapted to calculate the pulse length based on $\Delta OPL$ and the number $N_C$ of counted peaks. The autocorrelation optical system can either be prism-based or electro-optical-interferometer based. The measurement system can be made very compact and is far less expensive and far easier to use as compared to prior art ultra-short pulse measurement systems.

29 Claims, 8 Drawing Sheets

OTHER PUBLICATIONS

Collier et al., "Uniaxial single-shot autocorrelator," Rev. Sci. Inst., vol. 70. No. 3 Mar. 1999. pp. 1599-1602.

Ranka et al., "Autocorrelation measurement of 6-fs pulses based on the two-photon induced photocurrent in a GaAsP photodiode," Opt. Lett. vol. 22 No. 17, Sep. 1, 1997.

Harvey et al., "Birefringent Fourier-transform imaging spectrometer," Optics Express vol. 12 No. 22, Nov. 1, 2004.

Fujimoto et al, "Generation and measurement of optical pulses as short as 16 fs," Appl. Phys. Lett., 44 (9) May 1, 1984.

* cited by examiner

SYSTEMS AND METHODS FOR MEASURING ULTRA-SHORT LIGHT PULSES

FIELD OF THE INVENTION

The present invention relates generally to measuring light pulses, and particularly to systems and methods for such measuring ultra-short laser light pulses using autocorrelation techniques.

BACKGROUND ART

Light sources such as lasers that generate "ultra-short" light pulses are becoming more commonplace in high-tech industries as new methods are being developed to utilize their characteristics. "Ultra-fast" and "ultra-short" typically refer to the temporal duration (length) of a light pulse, and in particular to pulses having durations less than a few hundred femtoseconds (fs). Present-day lasers are capable of producing light pulses of 50-100 fs and as short as 6 fs. Future lasers will be capable of producing even shorter light pulses.

For such ultra-short pulses, a unique advantage is their extremely high energies over ultra-short time scales. Such pulses allow access to unique physical processes that only occur at these energies and time scales, such as laser micromachining and certain biological and medical applications (e.g., laser in-situ keratomileusis (LASIK)). Knowing the pulse irradiance (measured in watts per unit area) with a high degree of accuracy is critical for most processes that employ ultra-short light pulses. In order to quantify the irradiance of ultra-short light pulses, one must know their exact temporal width.

Because ultra-short light pulses exist for extremely short time periods by definition, there is no direct way to measure their width. This is largely because most atoms and materials do not react sufficiently fast. Accordingly, the state-of-the-art measurement techniques for ultra-short pulses rely on measuring a non-linear effect caused by an ultra-short pulse and then backing out the pulse length.

The most common technique for measuring ultra-short light pulses involves splitting the incident pulse (beam) inside a Michelson-style interferometer, with one interferometer arm sweeping back and forth. The distance the arm must sweep equates to the physical length of the laser pulse (e.g., a 100 fs pulse represents a length of 30 µm). The interferometer provides the autocorrelation of the pulse, which is measured using an oscilloscope. However, a Michelson interferometer is very sensitive to alignment so it typically takes significant time to set up and maintain it in proper operating condition for making measurements.

Another pulse measuring technique called Frequency Resolved Optical Gating (FROG) relies on splitting the incident beam into two separate beams and recombining the separated beams inside a non-linear crystal. Four-wave mixing occurs inside the crystal and a new beam is generated that has double the optical frequency of the input beam. The new beam is recorded via a detector (e.g., a charge-coupled device or "CCD"), which provides information about the frequency and temporal information of the new beam shape. When viewing the beam profile using the FROG technique, one axis represents the spectrum of the pulse (which is relatively wide since the pulse is relatively short), while the other axis represents the temporal shape. While the FROG technique is very convenient, it requires that the incident beam have a perfect Gaussian profile. Most lasers, however, do not have the requisite idealized Gaussian profile, so that the time and spectrum measurements tend to be inaccurate.

More recently, a pulse-width measuring technique was developed by Reid et al., and described in the article by Reid et al., entitled "Light-emitting diodes as measurement devices for femtosecond laser pulses," Optics Letters, Vol. 22, No. 4, published on Feb. 15, 1997 (hereinafter, "the Reid article"), which article is incorporated by reference herein. The Reid article device utilizes a movable prism and an unbiased LED that has a non-linear power-dependent response. The prism splits an initial laser beam into two shifted beams that interfere. Moving the prism for each new incident pulse causes an autocorrelation interference pattern to sweep across the LED detector, which generates a corresponding autocorrelation signal.

Though various approaches to ultra-short pulse measurement are embodied in a number of different commercial devices, these devices have significant shortcomings. One serious shortcoming is that they are unusually difficult to use in practice mostly because they are difficult to align. This lack of functionality is particularly problematic given that frequent system alignment is needed for most light-pulse-measurement applications. Further, the measurement devices are subject to beam-shape limitations—that is to say, poor-quality beam shapes result in poor measurements. In addition, the typical ultra-short pulse measurement device is very costly—about $20,000 or more in present-day dollars.

Accordingly, efficient, cost-effective and commercially viable systems and methods for measuring ultra-short light pulses are needed.

SUMMARY OF THE INVENTION

One aspect of the invention is a system for measuring the temporal pulse length ($\tau_0$) (also referred to as the "pulse width") of an ultra-short light pulse. The system includes an autocorrelation optical system adapted to receive the light pulse and create therefrom two beams having an associated optical path length difference $\Delta OPL$ that varies to form an autocorrelation interference pattern representative of an autocorrelation of the light pulse. The autocorrelation optical system can be prism-based wherein a movable Wollaston prism is used to vary $\Delta OPL$. The autocorrelation optical system can also be interferometer-based, wherein electro-optical (EO) elements in one or both interferometer arms are used to vary $\Delta OPL$ by applying a variable voltage to the EO elements. An LED detector is arranged to detect the autocorrelation interference pattern that sweeps across the detector as $\Delta OPL$ is changed for each new light pulse $P_0$. The LED detector is adapted to generate therefrom a raw autocorrelation signal based on the system processing a number of substantially similar light pulses $P_0$ each with a different value for $\Delta OPL$. A signal-processing unit is electrically coupled to the LED detector and adapted to condition the raw autocorrelation signal and form from the conditioned signal a digital count signal representative of a number of counted peaks in the autocorrelation signals that are above the full-width half-max (FWHM) of the raw autocorrelation signal. A control electronics unit is operably coupled to the autocorrelation optical system and the signal-processing unit and is adapted to cause the varying $\Delta OPL$ that forms the autocorrelation interference pattern. The control electronics unit also provides a difference signal ($S_\Delta$) representative of the $\Delta OPL$ to the signal-processing unit. The signal-processing unit is adapted to calculate the pulse length based on $\Delta OPL$ and the number $N_C$ of counted autocorrelation signal peaks.

Another aspect of the invention is a method of measuring the temporal pulse length of an ultra-short light pulse using a number of substantially similar input light pulses. The method includes dividing each light pulse into two co-polarized light beams having an associated optical path length difference $\Delta OPL$, providing a different value of $\Delta OPL$ for each light pulse, and interfering the two light beams associated with each light pulse to form an autocorrelation interference pattern representative of the autocorrelation of the light pulse. The method also includes using an LED detector to convert the autocorrelation interference pattern into an autocorrelation signal. The method further includes measuring the autocorrelation signal to determine a full-width half-max (FWHM) threshold $L_{TH}$ of the autocorrelation signal. The method also includes using a programmable comparator and a digital logic counter to count the number $N_C$ of peaks in the autocorrelation signal that fall above the signal's FWHM based on threshold $L_{TH}$, and then forming a digital count signal representative of the number $N_C$ of counted peaks. The method also includes using a microcontroller to calculate the pulse length based on $\Delta OPL$ and $N_C$.

Additional features and advantages of the invention will be set forth in the detailed description that follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

The present invention is directed to system and methods for measuring the (temporal) pulse length of ultra-short light pulses such as created by ultra-fast lasers. The systems and methods of the present invention are particularly suited for forming a commercially viable ultra-short pulse measurement device.

An overview of the light-pulse measurement system is first provided, followed by details of an example measurement system having a prism-based autocorrelator optical system. Example light-pulse measurement systems based on several different EO-based autocorrelator optical systems are then described. The benefits of the present invention in terms of system alignment and pulse-width accuracy are then discussed.

In the description below, reference is made to an "autocorrelation signal" $S_A$ that may be, for example, a "raw" autocorrelation signal $S_{AR}$ or a conditioned autocorrelation signal $S_{AC}$ that reflects a particular processing state of the autocorrelation signal. Reference to autocorrelation signal $S_A$ is thus general and is not limited to a particular processing state, as will be understood by one skilled in the art in the context in which the phrase is used.

Also in the description below, the systems and methods of the present invention are based on measuring a number of different substantially similar light pulses $P_0$. Thus, the invention is described in connection with measuring the temporal pulse length $\tau_0$ of a light pulses $P_0$, which pulse length is representative of the average pulse width of those light pulses $P_0$ used to make the measurement. For the sake of discussion, light pulse $P_0$ is referred to in the singular where convenient.

I. Light-Pulse Measurement System Overview

Figure 1:
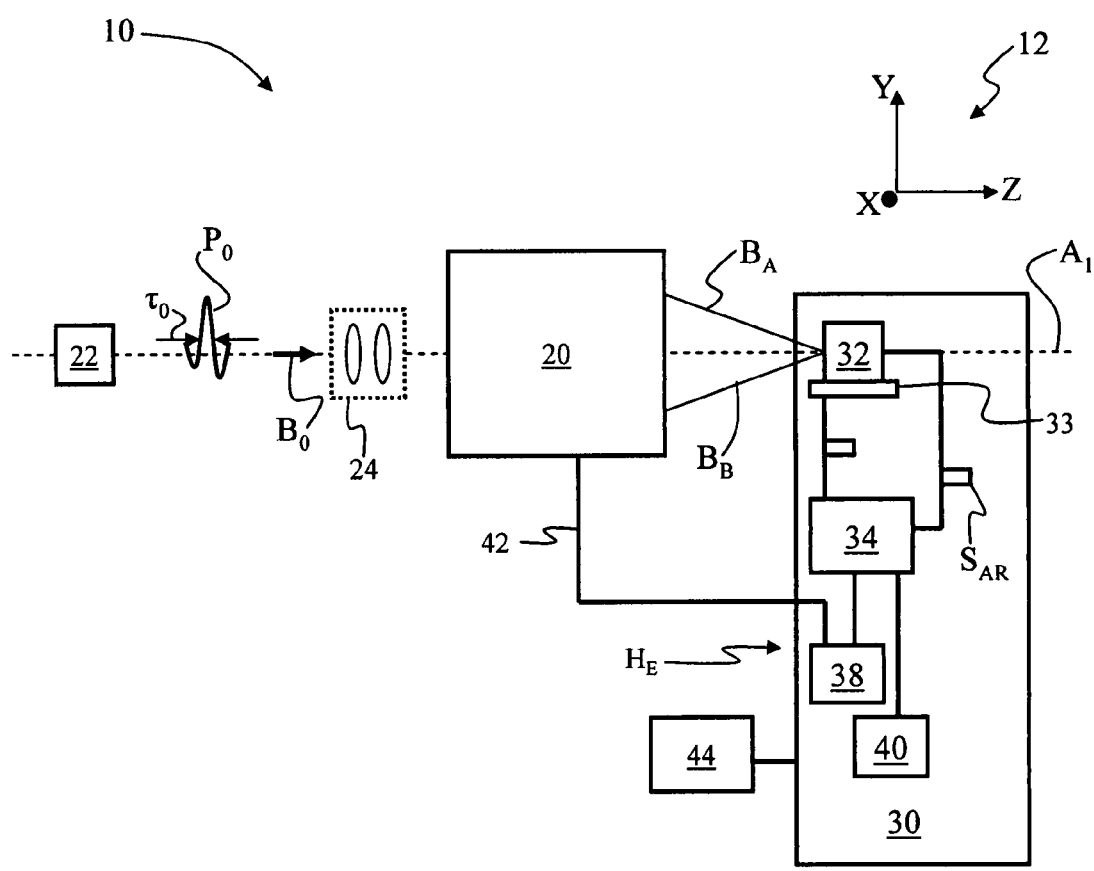
FIG. 1 is a schematic diagram of a generalized embodiment of the light-pulse measurement system according to the present invention.
Figure 2:
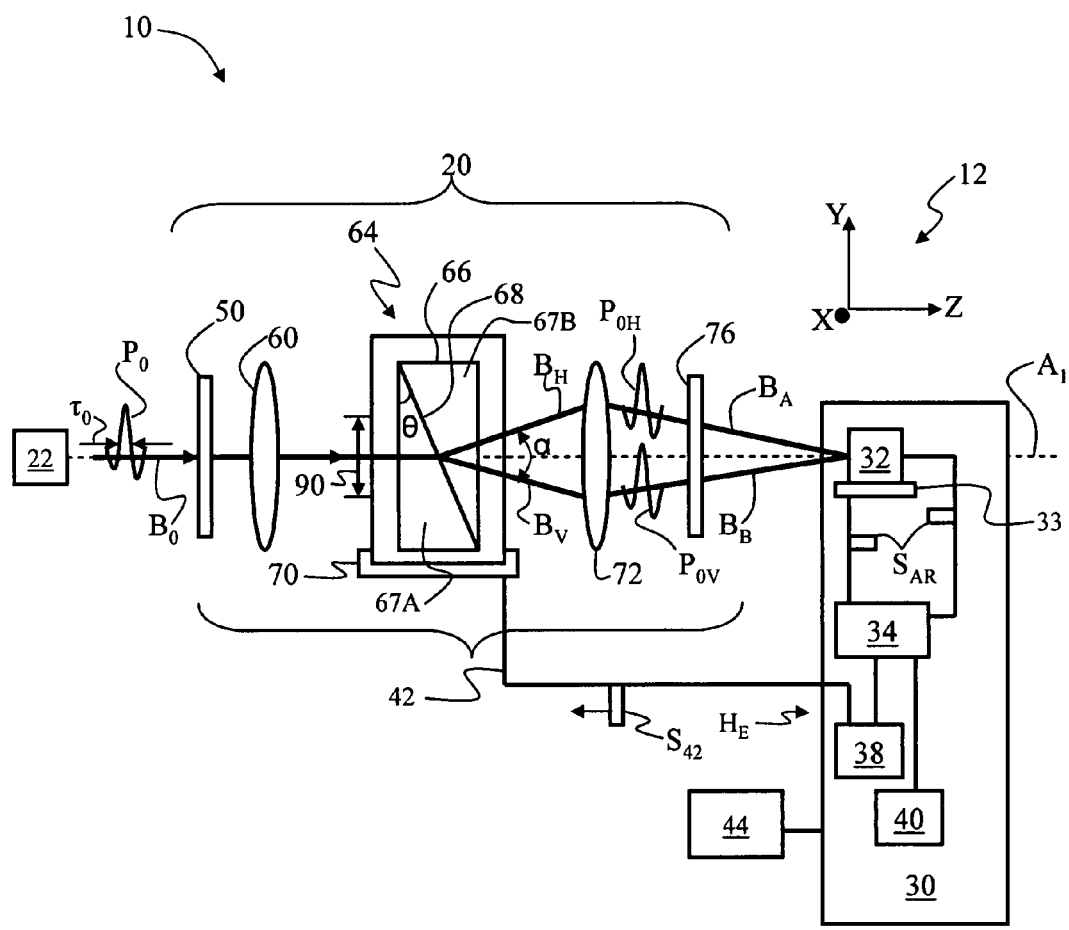
FIG. 2 is a schematic diagram similar to FIG. 1, showing the details of an example embodiment of a prism-based autocorrelator optical system.

FIG. 1 is a schematic diagram of a generalized embodiment of a light-pulse measurement system 10 of the present invention. Cartesian coordinates 12 are shown for the sake of reference, with the Y direction being "vertical," the X direction being "horizontal" and into the paper, and the Z direction also being horizontal and in the plane of the paper.

System 10 includes, along an optical axis $A_1$, an autocorrelator optical system 20 adapted to receive an incident light pulse $P_0$ of temporal pulse length $\tau_0$ in a beam $B_0$ and generate therefrom (and output) two interfering beams $B_A$ and $B_B$ that create an interference pattern representative of an autocorrelation of incident light pulse $P_0$. In an example embodiment, pulse length $\tau_0$ is measured at the full-width half-max (FWHM) of the light pulse. In an example embodiment, incident light pulse $P_0$ is an ultra-short laser pulse emitted by a light source 22 that is or includes a laser.

In an example embodiment, system 10 optionally includes an optical coupling system 24 adapted to optically couple light source 22 to autocorrelator optical system 20.

In order to efficiently measure the pulse length $\tau_0$, system 10 also has an electronics unit 30 adapted to receive and detect interfered beams $B_A$ and $B_B$ for each light inputted light pulse $P_0$, and generate and process the associated electrical autocorrelation signal $S_A$ formed by processing a number of inputted light pulses $P_0$ each having a different associated value for $\Delta OPL$. In an example embodiment, electronics unit 30 includes a light-emitting diode (LED) detector 32 supported on a movable stage 33, a signal-processing unit 34 electrically coupled to the LED detector and the moveable stage, control electronics unit 38 electrically coupled to the signal-processing unit, and a display unit 40 electrically coupled to the signal-processing unit. Electronics unit 30 is electrically connected to autocorrelation optical system 20 via an electrical connection 42 that may include a plurality of electrical lines. A power supply 44 is operably connected to electronics unit 30 and provides the electrical power for system 10.

Typically, light-pulse measurement systems use very thin non-linear crystals and photomultiplier tubes (PMT's) to record the autocorrelation signal. However, non-linear crystals and PMT's are very expensive and easily damaged. On the other hand, LED detector 32 is or otherwise includes a simple LED in which a non-linear process occurs. In order for this process to occur, LED detector 32 is chosen to match the photon energy of the light incident thereon. Specifically, the LED bandgap should be close to but greater than the photon energy. Thus, when the intensity of the light incident LED detector 32 is sufficiently high, multi-photon absorption occurs and the autocorrelation signal $S_A$ is generated.

The operation of electronics unit 30 is discussed in greater detail below in connection with the various example measurement system embodiments set forth below.

II. Prism-Based Measurement System a) Prism-Based Autocorrelator Optical System

In an example embodiment, autocorrelator optical system 20 is prism-based and includes, in order along optical axis $A_1$ (which is oriented along the Z-direction), a half-wave plate 50, a first lens 60, and a prism unit 64. Prism unit 64 includes a Wollaston prism 66 formed by two prisms 67A and 67B with a prism interface 68 therebetween. Prism unit 64 is supported by a movable stage 70 that is operably coupled to prism driver 38 of electronics unit 30. System 20 further includes a second lens 72 arranged along optical axis $A_1$ and downstream of prism unit 64, and a 45° linear polarizer 76 arranged along optical axis $A_1$ and downstream of the second lens. LED detector 32 of electronics unit 30 is arranged at the focus of second lens 72.

In operation of system 20, a linearly-polarized incident light pulse $P_0$ having an associated light beam path $B_0$ encounters half-wave plate 50, which rotates the polarization of the incident light pulse by 45°. Incident light pulse $P_0$ is then focused by first lens 60 and travels to prism unit 64 and to Wollaston prism 66 located therein. A suitable prism 66 is available from Zeta International Corp. of Mt. Prospect, Ill. and costs about $440 for a 10 mm clear-aperture, 5° wedge-angle air-spaced version. Incident light pulse $P_0$ is focused by first lens 60 at prism interface 68. Because prisms 67A and 67B have orthogonal optic axes associated with an extraordinary index of refraction $n_e$ and an ordinary index of refraction $n_o$, Wollaston prism 66 forms from incident light beam $B_0$ two orthogonally polarized light beams: a horizontally polarized light beam $B_H$ that includes an associated horizontally polarized light pulse $P_H$) and a vertically polarized light beam $B_V$ that includes an associated vertically polarized light pulse $P_V$. The angular separation of light beams $B_H$ and $B_V$ is called the splitting angle $\alpha$ and is given by the relation:

$$\alpha = 2(n_e - n_o) \tan \theta \qquad \text{Equation (1)}$$

where $\theta$ is the prism wedge angle.

One of the light beams ($B_H$) travels a longer optical path length inside prism 67B than the other light beam. Accordingly, by slowly moving prism unit 64 back and forth in the Y-direction over a range 90 the optical path length (OPL) experienced by the two beams $B_H$ and $B_V$ for each incident light pulse $P_0$ changes with time, i.e., the optical path length difference $\Delta$OPL between these beams changes with each incident light pulse. This leads to the autocorrelation of the incident pulse $P_0$ when the light beams are made to overlap (interfere). In an example embodiment, control electronics unit 38 of electronics unit 30 is (or includes) a prism driver that controls the movement of prism unit 64 via control signal $S_{42}$ sent to movable stage 70 via electrical link 42, as described below so that a different value for $\Delta$OPL occur for each incident light pulse $P_0$.

In order to detect an autocorrelation signal via the movement of Wollaston prism 66, light beams $B_H$ and $B_V$ are focused by second lens 72 through 45° linear polarizer 76. This makes the two beams co-polarized at 45° polarization so that they are able to interfere when focused onto LED detector 32. Thus, upon passing through 45° polarizer 76, light beams $B_H$ and $B_V$ become co-polarized beams $B_A$ and $B_B$, respectively. The interference pattern formed on LED detector 32 by the interference of beams $B_A$ and $B_B$ is converted into the aforementioned (analog) electrical signal $S_A$ representative of the autocorrelation of input pulse $P_0$. Signal $S_A$ is hereinafter generally referred to as the "autocorrelation signal."

Figure 3:
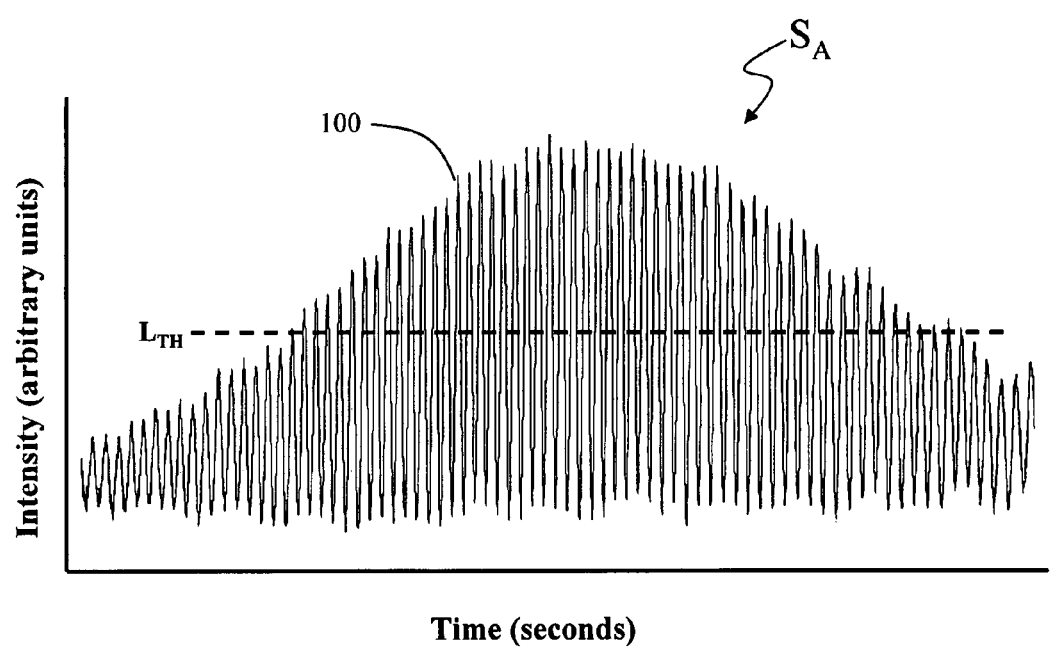
FIG. 3 is a plot of the intensity (arbitrary units) vs. delay (seconds) for an example autocorrelation signal $S_A$ produced by the autocorrelation optical system of FIG. 2.

FIG. 3 plots the intensity (arbitrary units) vs. time (second) for an example autocorrelation signal $S_A$ obtained as described above. The overall envelope of the autocorrelation signal results from the low electrical load on LED detector 32. Signal $S_A$ also includes a number of peaks 100. The modulation of autocorrelation signal $S_A$ is the correlation of the electric field of light pulse $P_0$ with itself, and with the modulation spacing (i.e., the distance between peaks 100) depending on the movement speed of prism unit 64.

The conventional approach to measuring the pulse length $\tau_0$ of light pulse $P_0$ is to connect LED detector 32 to an oscilloscope and record signal $S_A$. Signal $S_A$ is then formatted and plotted, and the number of peaks 100 over a specified range is counted by hand. From this data, the Full-Width Half-Maximum (FWHM) pulse length $\tau_0$ can be determined. However, this is a very tedious and inefficient process to carry out, particularly while trying to make adjustments to the light source being measured, such as when the light source is a laser and adjusting the laser cavity. The present invention can be automated to provide a quick and accurate pulse length calculation.

b) Electronics Unit

Figure 4:
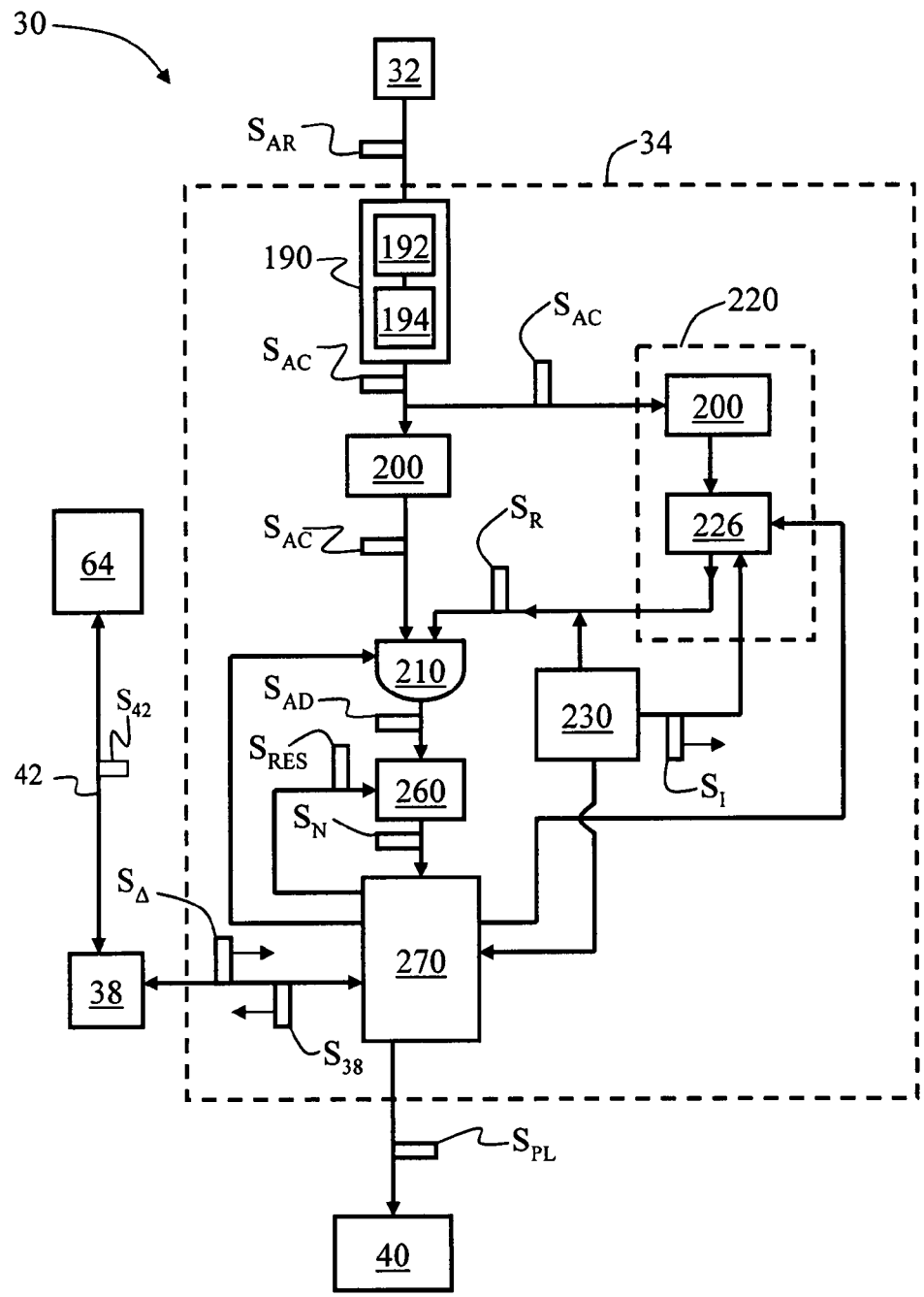
FIG. 4 is a detailed schematic diagram of an example embodiment of the electronics unit suitable for use with the prism-based autocorrelation optical system of FIG. 2.

FIG. 4 is a detailed schematic diagram of an example embodiment of electronics unit 30 suitable for use with a prism-based autocorrelation optical system 20. As discussed above, electronics unit 30 includes LED detector 32. In an example embodiment, LED detector 32 is, for example, an AlGaAs LED, which is available from local electronics stores and that costs about $2.00. Electronics unit 30 also includes signal-processing unit 34. In this prism-based embodiment, control electronics unit 38 is a prism driver. In an example embodiment, signal-processing unit 34 includes signal-conditioning electronics 190 electrically coupled to LED detector 32 and adapted to condition the raw autocorrelation signal $S_{AR}$ generated thereby prior to performing signal processing. In an example embodiment, signal processing electronics 190 includes an amplifier 192 that amplifies the relatively weak (e.g., on the order 60 to 200 millivolts) autocorrelation signal $S_A$, and an electrical filter 194 that filters out noise from the amplified signal $S_A$, thereby forming a conditioned autocorrelation signal $S_{AC}$.

Signal-processing unit 34 further includes a first analog buffer 200 electrically connected to the output side of signal-conditioning electronics 190. Analog buffer 200 is adapted to store the (conditioned) analog autocorrelation signal $S_A$ and to isolate LED detector 32 from the other electronic elements, whose load can distort the autocorrelation signal. The output of analog buffer 200 is electrically connected to the input side of a programmable comparator 210.

Signal-processing unit 34 also includes a reference input unit 220 that includes a second analog buffer 200 electrically connected at its input side to the output side of signal-conditioning electronics 190 and electrically connected at its output side to a FWRM tracking circuit 226. FWHM tracking circuit 226 is, in turn, electrically connected at the output side to the input side of comparator 210. FWHM tracking circuit 226 is adapted to determine the FWHM of autocorrelation signal $S_A$ (e.g., the conditioned autocorrelation signal $S_{AC}$) and to provide a reference signal $S_R$ corresponding thereto.

Reference input unit 220 is also operably coupled to a user input device 230 (e.g., a programmable signal generator) adapted to allow a user to manually input a reference signal $S_R$. In an example embodiment, user input is used to tune FWHM tracking circuit 226, e.g., via a user input signal SI from user input device 230.

Signal-processing unit 34 further includes a digital logic counter 260 electrically coupled at its input side to comparator 210, and electrically coupled at its output side to a microcontroller 270. Prism driver 38 and display 40 are also electrically coupled to microcontroller 270, as is user input device 230. In an example embodiment, microcontroller 270 is one of the BASIC Stamp® microcontrollers available from Parallax, Inc., Rocklin, Calif., for about $80. Microcontroller 270 is adapted (e.g., programmed) to carry out the method of operation of system 10 as described herein.

c) Method of Operation

The method of operation of electronics unit 30 in prism-based measurement system 10 is now described. First, the raw autocorrelation signal $S_{AR}$ is created from a number of input pulses $P_0$ by prism-based autocorrelation optical system 20 as described above. This raw autocorrelation signal $S_{AR}$ then proceeds from LED detector 32 to signal-conditioning electronics 190, where the autocorrelation signal is conditioned (e.g., amplified and filtered) to form conditioned autocorrelation signal $S_{AC}$. The conditioned autocorrelation signal $S_{AC}$ then travels to and is temporality stored in first analog buffer 200.

In an example embodiment where reference signal $S_R$ is generated automatically, conditioned autocorrelation signal $S_{AC}$ is also stored in second analog buffer 200 in reference input unit 220. FWHM tracking circuit 226 in reference input unit 220 analyzes the autocorrelation signal from second analog buffer 200 and determines the threshold level $L_{TH}$ corresponding to the FWHM of signal $S_{AC}$. FWHM tracking circuit 226 then generates a reference signal $S_R$ representative of the FWHM threshold level $L_{TH}$ as illustrated in FIG. 3. This is done because determining the pulse length $\tau_0$ of input pulse $P_0$ only requires counting peaks 100 in the autocorrelation signal that are above its FWHM.

Reference signal $S_R$ is provided as an input to comparator 210, which sets its threshold level to correspond to threshold level $L_{TH}$ so that it only those peaks in the (conditioned) autocorrelation signal above the FWHM are counted. Thus, comparator 210 compares autocorrelation signal $S_{AC}$ to threshold signal $S_R$ and generates a digital autocorrelation signal $S_{AD}$ having digital logic levels for the portion of the signal above the FWHM. Digital autocorrelation signal $S_{AD}$ proceeds to digital logic counter 260, which is adapted to count the peaks 100 in this signal and generate a corresponding digital count signal $S_N$ representative of the number of counted peaks ("counts") $N_C$. Digital count signal $S_N$ is then provided to microcontroller 270 for processing.

Meanwhile, microcontroller 270 activates prism driver 38 via a signal $S_{38}$, which generates a stage control signal $S_{42}$. Stage control signal $S_{42}$ causes stage 70 to move in the Y-direction, along with prism unit 64 supported thereby, as indicated by double-arrow 90. In this example embodiment, prism driver 38 also generates a "difference" signal $S_\Delta$ representative of the relative position of prism unit 64 relative to optical axis $A_1$, and transmits this signal to microcontroller 270. Signal $S_\Delta$ is called a "difference" signal because it is representative of the optical path length difference $\Delta OPL$ between beams $B_1$ and $B_2$. This allows prism unit 64 to be moved into position for each new input pulse $P_0$.

Microcontroller 270 is adapted (e.g., programmed) to calculate the pulse length $\tau_0$ of input pulse $P_0$ based on the position of prism unit 64 (and thus optical path length difference $\Delta OPL$) as represented by difference signals $S_\Delta$, and the number of peaks $N_C$ in the autocorrelation signal as represented by digital count signal $S_N$. This calculation is described below. After each pass of prism unit 64 over a select translation movement range 90, in an example embodiment microcontroller 270 generates a calculated pulse-length signal $S_{PL}$ representative of pulse length $\tau_0$ and sends this signal to display 40 to display the calculated pulse length. Microcontroller 270 also sends a reset signal $S_{RES}$ to digital logic counter 260 that resets the digital logic counter to zero after each pass of prism unit 64 over the select translation range 90 so that another pulse-length measurement can be made.

d) Pulse Length Calculation

To calculate the pulse length $\tau_0$ for the prism-based autocorrelator system 20, the prism wedge angle $\theta$ and the extraordinary and ordinary indices refraction $n_e$ and $n_o$ of the prism must be known. Example values for these parameters are $\theta \sim 23°$, $n_e = 1.547$ and $n_o = 1.538$, which per equation (1) yield a splitting angle $\alpha = 0.50°$.

In an example embodiment, an estimate of the range for pulse length $\tau_0$ is inputted (e.g., via user input unit 230) into microcontroller 270. This narrows the needed travel range 90 of Wollaston prism 66, which in turn narrows the range of autocorrelation signal $S_A$.

For short pulses $P_0$, only a small travel distance d within range 90 is required because the autocorrelation trace is small. By moving prism unit 64 over a range 90 greater than necessary, the possibility of reading noise increases.

The travel distance d of prism unit 64 is in the Y direction and is given by the equation $$d = \frac{c \cdot (\tau_e)}{2 \cdot (n_e - n_o)\tan\theta} \quad \text{Equation (2)}$$

where c is the speed of light in vacuum and $\tau_e$ is the expected pulse length. This distance is the deviation from the center position of the prism on axis $A_1$.

Once travel distance d is known, microprocessor 270 directs prism driver 38 to move prism unit 64 over the corresponding travel range 90 as described above. As prism unit 64 travels, signal-processing unit 34 digitizes and counts the peaks 100 in the autocorrelation signal as described above.

The pulse length $\tau_0$ is calculated via the equation $$\tau_0 = \frac{N_C \cdot \lambda}{\gamma \cdot c} \quad \text{Equation (3)}$$

where $\lambda$ the wavelength of the input light pulse $P_0$, c is the speed of light in a vacuum, and $\gamma$ is a beam-profile parameter that described the profile of the input beam $B_0$. For Gaussian-profile input pulses $P_0$, $\gamma$ is ~1.414 and for sech²-profile input pulses, γ~1.543. These numbers come from the shape of the pulse and their autocorrelation.

In addition, the light propagating in autocorrelator optical system 20 passes through optical material in prism unit 64, first and second lenses 60 and 72, half-wave plate 50 and 45° polarizer 76. This causes input pulse $P_0$ to stretch prior to its width $\tau_0$ being measured. The amount of stretch depends on the second and third terms of chromatic dispersion of the optical material through which the input pulse passes. The "stretched" pulse length $\tau_{chirp}$ is give by $$\tau_{chirp} = \tau_0 \cdot \sqrt{1 + \left[\frac{\beta_2 Z_L}{\tau_0^2}\right]^2 + \left[\frac{\beta_3 Z_L}{2\tau_0^3}\right]^2} \quad \text{Equation (4)}$$

where $\tau_o$ is the input pulse length, $\beta_2$ and $\beta_3$ are the dispersion parameters for the materials used in the autocorrelator, and $Z_L$ is the length of optical material through which the input pulse travels. The stretched pulse length $\tau_{chirp}$ is what signal-processing unit 34 initially measures. However, by using the number of peaks $N_C$ and by knowing the amount of stretch that the system adds per equation (4) above, the original pulse length $\tau_0$ is calculated.

III. Electro-Optics (EO)-Based Measurement System

An example embodiment of the present invention is an electro-optics (EO)-based light-pulse measurement system 10. Several example embodiments of EO light-pulse measurement systems 10 are described below.

a) Bulk-Optics EO-Based Autocorrelator Optical System

Figure 5:
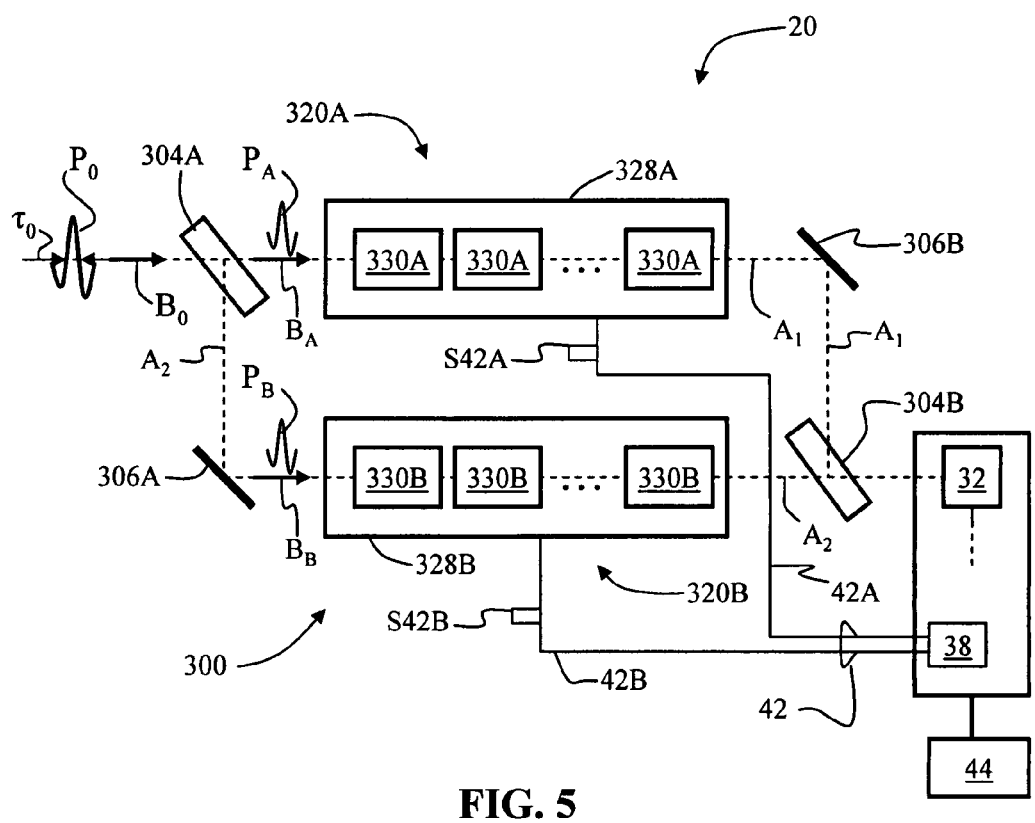
FIG. 5 is an example embodiment of a bulk-optics electro-optics (EO) based autocorrelation optical system for the measurement system of FIG. 1.

FIG. 5 is a schematic diagram of an example embodiment of a bulk-optics EO autocorrelator optical system 20. System 20 includes a Mach-Zehnder (MZ) interferometer 300 having a first 50-50 beamsplitter 304A that forms a second optical axis $A_2$ that starts out orthogonal to optical axis $A_1$. A first mirror 306A is located along second optical axis $A_2$ so as to fold this optical axis to bring it parallel to optical axis $A_1$. A second mirror 306B is located along optical axis $A_1$ downstream of first beamsplitter 304A. This second mirror folds optical axis $A_1$ so that it intersects optical axis $A_2$. A second 50-50 beamsplitter 304B is arranged at the intersection of axes $A_1$ and $A_2$, and serves to re-combine axis $A_2$ with axis $A_1$. LED detector 32 is arranged immediately downstream of this second beamsplitter 304B along the re-formed optical axis $A_1$.

The optical path associated with optical axis $A_1$ between the two beamsplitters defines a first interferometer arm 320A having an optical path length $OPL_A$ that carries beam $B_A$. Likewise, the optical path associated with optical axis $A_2$ between the two beamsplitters defines a second interferometer arm 320B having an optical path length $OPL_B$ that carries beam $B_B$. The optical path length difference between the two interferometer arms is thus defined as $\Delta OPL = (OPL_A - OPL_B)$.

EO autocorrelator optical system 20 includes a first EO unit 328A arranged in first interferometer arm 320A, and a second EO unit 328B arranged in second interferometer arm 320B. In an example embodiment, EO unit 328A includes at least one EO member 330A, while EO unit 330B includes at least one EO member 330B. In an example embodiment, EO members 330A and 330B are EO crystals having a large EO coefficient along an axis orthogonal to the corresponding optical axis $A_1$ or $A_2$ and that is aligned with the polarization of incident light pulse $P_0$. Example crystals include lithium niobate ($Li_2NO_3O$) as well as crystals such as $BaTiO_3$, $KNbO_3$, and $KTa_{0.35}Nb_{0.65}O_3$ that have relatively large EO coefficients and that would keep the applied voltages relatively low. EO units 328A and 328B are electrically connected to electronics unit 30 via electrical connection 42 and electrical lines 42A and 42B, respectively, included therein. In this EO-based embodiment, control electronics unit 38 is an EO-unit voltage source, as described below.

In the operation of EO autocorrelation optical system 20, linearly-polarized incident light pulses $P_0$ having an associated light beam path $B_0$ encounters first 50-50 beamsplitter 304A. Beamsplitter 304A splits each incident light pulse into two co-polarized incident light pulses $P_A$ and $P_B$ (that form corresponding beams $B_A$ and $B_B$) that travel over corresponding interferometer arms 320A and 320B. Light pulse $P_1$ travels through EO unit 328A and the at least one EO element 330A therein, while light pulse $P_2$ travels through EO unit 328B and the at least one EO element 330B therein. An electrical signal $S_{42A}$ from EO-unit voltage source 38 provides a voltage $V_A$ that can vary to change the effective optical path length $OPL_A$ of interferometer arm 320A for each incident light pulse $P_0$ via a change in refractive index of the at least one EO element 330A. Likewise, an electrical signal $S_{42B}$ from EO-unit voltage source 38 provides a voltage $V_B$ that can to change the effective optical path length $OPL_B$ of interferometer arm 320B for each incident light pulse $P_0$ via a change in the refractive index of the at least one EO element 330B therein.

Assuming that when an intermediate voltage $V_1$ is provided to EO units 328A and 328B that the optical path lengths $OPL_A$ and $OPL_B$ are the same, voltages $V_A$ and $V_B$ can be varied (say, with $V_B < V_I$ and $V_A > V_I$) in order to sweep through varying values for the optical path length differences $\Delta OPL$, which allows for the sweeping of pulses $P_A$ and $P_B$ to perform the autocorrelation of input pulse $P_0$ based on a number of substantially similar input pulses $P_0$. Thus, pulses $P_A$ and $P_B$ exit respective EO units 328A and 328B with different delays and are combined (interfered) at 50-50 beamsplitter 304B. The interfered pulses $P_A$ and $P_B$ associated with each input pulses $P_0$ form an autocorrelation interference pattern that sweeps over LED detector 32, which converts this pattern into autocorrelation signal $S_A$. Autocorrelation signal $S_A$ (that is to say, the raw autocorrelation signal $S_{AR}$) is then processed as described below to obtain a measurement of the pulse length $\tau_0$.

Rather than relying on prism movements to provide the phase delay between the two interfered optical beams for each inputted light pulse $P_0$, the EO autocorrelator optical system 20 of the present invention relies on varying the voltage applied to the EO units 328A and 328B by EO-unit voltage source 38. In an example embodiment, each EO unit 328A and 328B includes multiple EO members 330A and 330B, respectively, so that a lower voltage is required to achieve the same change in the optical path length difference $\Delta OPL$ than is possible with a single EO member that operates at a higher voltage. Further, by providing both a positive path length change in one interferometer arm and a negative path length change in the other interferometer arm, the required voltages provided by signals $S_{42A}$ and $S_{42B}$ are further reduced.

The number of EO devices 330A and 330B used depends on the type of EO members used. If one wants to measure pulses as short as 500 fs, then the total change in the pulse needs to be >1000 fs. For an average EO coefficient of $70 \times 10^{-12}$ mN, and if each EO member is X mm long, then the required applied voltage per EO member (assuming $N_{EO}$ is the number of EO members in each arm) is given by:

$$V = 2d \Delta_{needed} / (N_{EO} \Delta n_{induced})$$

where d is the combined length of all EO members in one interferometer arm, $\Delta n_{needed}$ is the indices difference needed to sweep over the given range, and $\Delta n_{induced}$ is the induced change in refractive index on one EO member. Note that $\Delta n_{needed}$ is calculated from the travel time difference between the two arms.

Assume $\tau_A$ is the time required for light to traverse arm 320A and $\tau_B$ the time required for light to traverse arm 320B, the delay introduced is $\tau_B - \tau_A = 2d\Delta n/c$ where $\Delta n = \Delta n_{needed}$.

The maximum voltage range is governed by the parameters of the particular EO member(s) used. Voltage values can be as high as 10 kV but are typically around 7 KV for most EO members. The minimum range is set by the length of the pulse to be measured. The longer the pulse length, the lower the voltage required.

b) Optical-Fiber-Based Eo Autocorrelator Optical System

Figure 6:
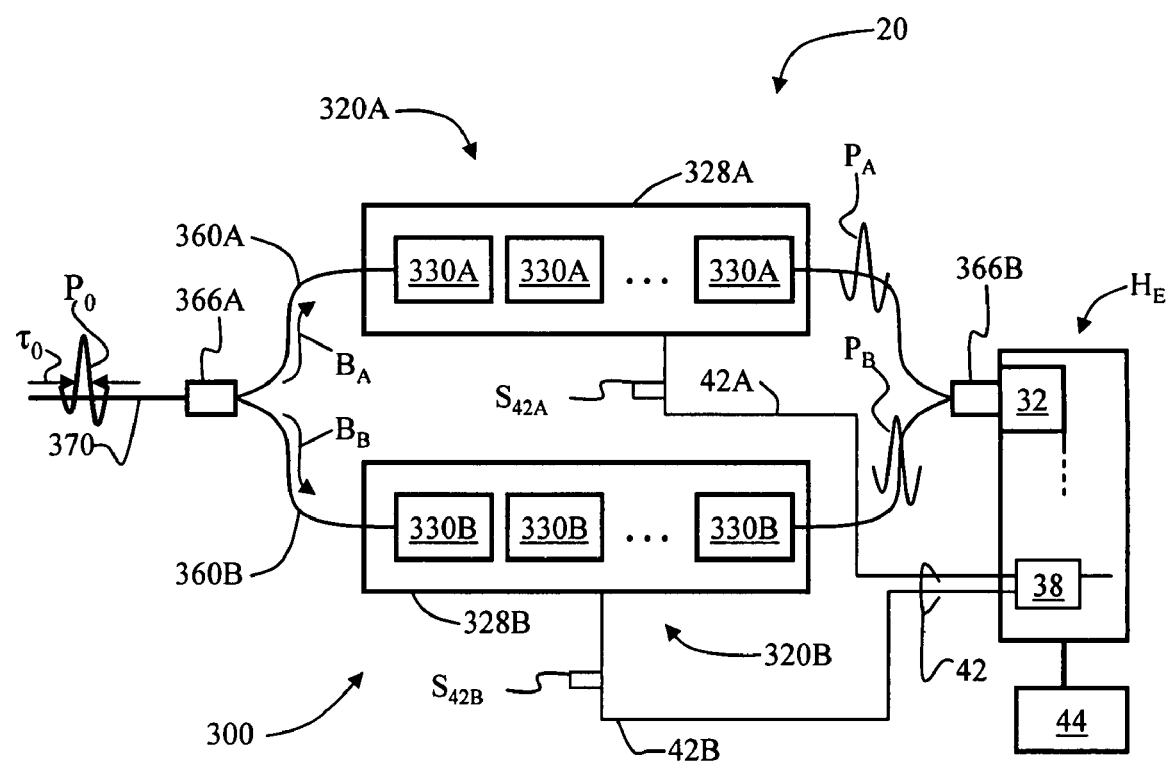
FIG. 6 is an example embodiment of an optical-fiber-based EO autocorrelation optical system for the measurement system of FIG. 1.

FIG. 6 is a schematic diagram of an optical-fiber-based EO autocorrelation optical system 20. System 20 of FIG. 6 is similar to that of FIG. 5, except that optical fiber sections 360A and 360B are used to form interferometer arms 320A and 320B. The use of optical fiber sections 360A and 360B eliminates the need for bulk-optics beamsplitters 304A and 304B, and mirrors 306A and 306B. Beamsplitters 304A and 304B are replaced with 3-dB splitters 366A and 366B, respectively. Also, input pulse $P_0$ is carried by an input optical fiber 370 optically coupled to input 3-dB splitter 366A. LED detector 32 is provided at the output end of 3-dB splitter 366B. Optical fiber sections 360A and 360B are preferably formed from single-mode optical fibers.

c) Integrated-Optical (IO) EO Autocorrelation Optical System

Figure 7:
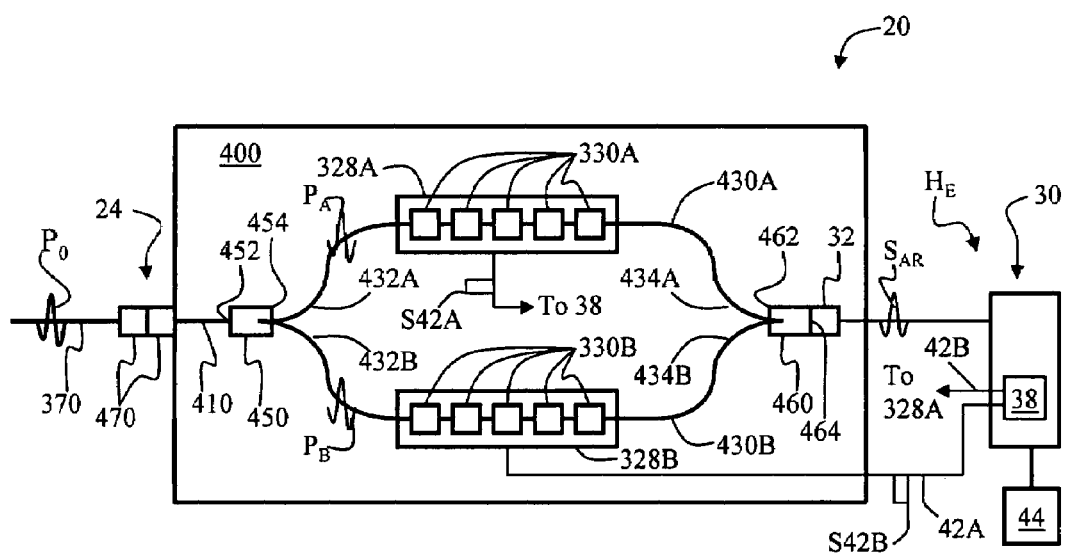
FIG. 7 is an example embodiment of an integrated optics (IO) electro-optics (EO) autocorrelation optical system for the measurement system of FIG. 1.

FIG. 7 is a schematic diagram of an example embodiment of an integrated-optical (IO) autocorrelation optical system 20 similar to the optical-fiber-based EO autocorrelation optical system of FIG. 6. The IO EO autocorrelation optical system 20 of FIG. 7 is formed on a substrate 400 suitable for supporting optical waveguides. In an example embodiment, substrate 400 is or includes silicon. In an example embodiment where the waveguides and EO members are grown on substrate 400, the substrate is one suited for the growth techniques used. In this regard, silicon processing techniques are well known and understood, and are therefore preferable.

Substrate 400 includes an input waveguide 410 having an input end 412. IO EO autocorrelator optical system 20 also includes first and second waveguide arms 430A and 430B having respective input and output ends 432A, 434A and 432B, 434B. In an example embodiment, the waveguides are formed as slab waveguides that are, for example, deposited atop the substrate.

Also included in system 20 is an input 3 dB splitter 450 having an input end 452 and an output end 454, and an output 3 dB splitter 460 having an input end 462 and an output end 464. Waveguide arm input ends 432A and 432B are optically coupled to the first 3 dB splitter 450 at its output end 454, while waveguide arm output ends 434A and 434B are optically coupled to the second 3 dB splitter at its input end 462, thereby forming an IO MZ interferometer 400 analogous to the bulk-optics MZ interferometer 100 of FIG. 5. Output end 414 of input waveguide 410 is optically coupled to input end 452 of the input 3 dB splitter 450. In an example embodiment, a fiber-optic coupler 470 (which is one form of the aforementioned optical coupling system 24) is provided at input end 412 of input waveguide 410 to allow for input optical fiber 370 (also preferably having a coupler 470) to be optically coupled to the input waveguide. The output end 464 of output 3 dB splitter is optically coupled to LED detector 32, which in an example embodiment is integrated with substrate 400.

IO EO autocorrelator optical system 20 includes EO units 328A and 328B that respectively include at least one EO member 330A and 330B. In an example embodiment, EO members 330A and 330B are lithium niobate EO modulators.

The operation of IO EO autocorrelation optical system 20 of FIG. 7 is analogous to that of the EO autocorrelation optical systems 20 of FIG. 5 and FIG. 6. Each input pulse $P_0$ traveling on input optical fiber 370 passes to input waveguide 410. Pulse $P_0$ is then split by 3 dB splitter 450, thereby forming two equal-intensity pulses $P_A$ and $P_B$. Pulse $P_A$ travels over waveguide arm 430A, while pulse $P_B$ travels over waveguide arm 430B. EO units 328A and 328B and the respective EO members 430A and 430B therein are activated via respective variable voltage signals S42A and S42B. This causes a varying optical path length difference $\Delta OPL$ for each input pulse $P_0$, which allows for the sweeping of the relative delay of pulses $P_A$ and $P_B$ to form the autocorrelation interference pattern representing the autocorrelation of pulse $P_0$. Pulses $P_A$ and $P_B$ encounter output 3 dB splitter 460, where the pulses are combined (outputted) and detected by LED detector 32 at the output end 264 of the output 3 dB splitter. LED detector 32 then generates autocorrelation signal $S_A$, which is processed by electronics unit 30 as described below.

By way of example, for waveguides 430A and 430B having a width of 50 microns, and ten EO members 330A and ten EO members 330B, the IO EO measurement system 10 is able to perform pulse-width measurements on pulse as short as 400 fs. Shorter pulses can be measured by increasing the number of EO members in EO units 328A and/or 328B, and/or by increasing voltages $V_A$ and/or $V_B$.

IO EO autocorrelator optical system 20 can be made quite small, which in turn makes the overall measurement system 10 very compact. In the case where system 20 is fabricated using a semiconductor substrate, then the limiting size factors are how close EO members 330A and 330B can be placed to one another, and how close the electrodes can be laid to avoid arcing. Assuming the EO members can be placed in a reasonable amount of space, system 20 could be made as small as a few inches by a few inches. The use of coupling optics 24 at the input end of system 20 would make the device somewhat larger but not significantly so. In an example embodiment, control electronics unit 30 (and optionally power supply 44) are housed in a electronics housing $H_E$ separate from autocorrelation optical system 20. Electronics housing $H_E$ need not be very large because the system does not use high voltage.

d) Electronics Unit

Figure 8:
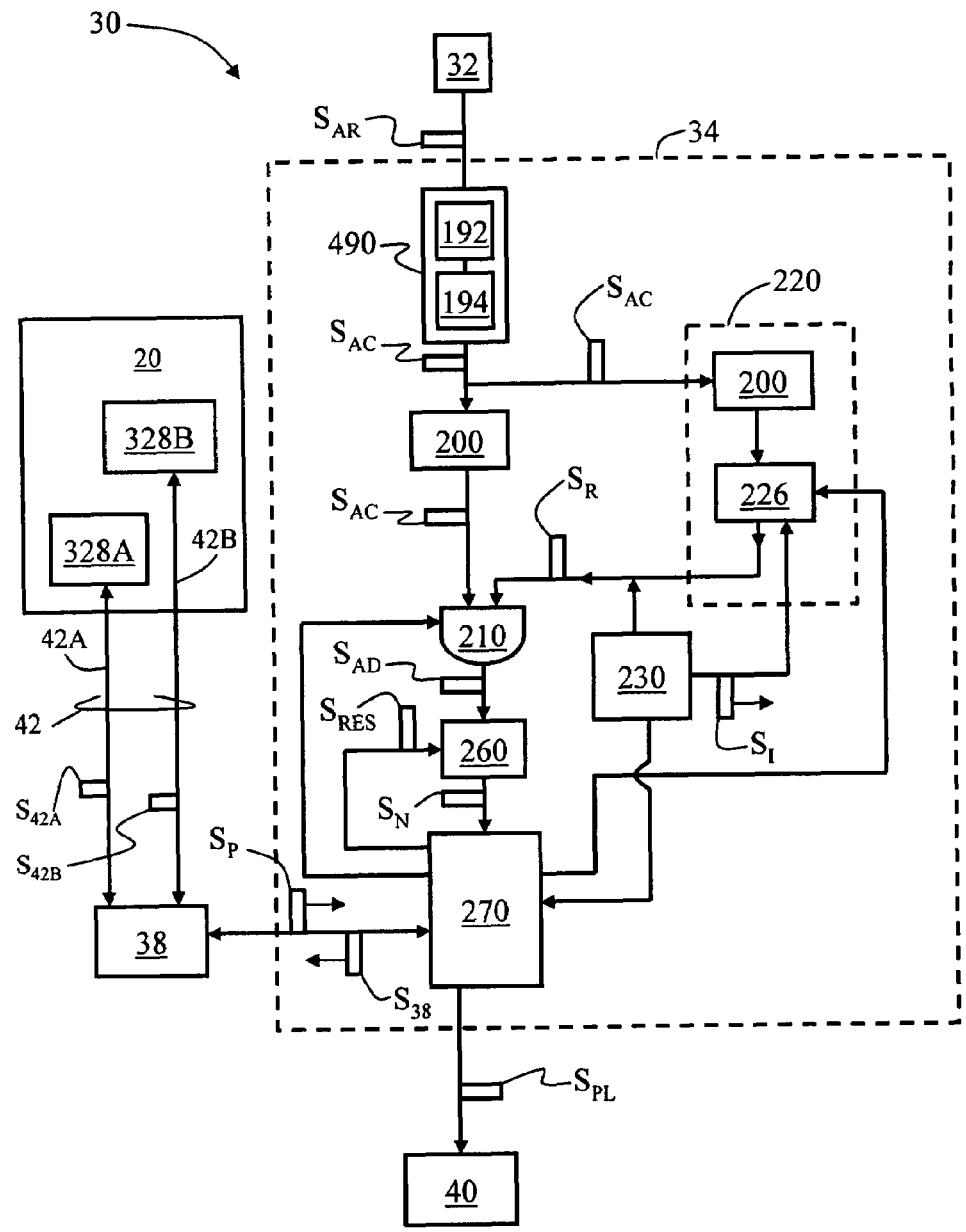
FIG. 8 is a detailed schematic diagram of an example embodiment of the electronics unit similar to that of FIG. 4, suitable for use with the various EO-based autocorrelation optical systems of the present invention.

FIG. 8 is a detailed schematic diagram of an example embodiment of electronics unit 30 suitable for use with the various embodiments of EO-based autocorrelation optical system 20 as described above. Electronics unit 30 includes most of the same elements as described above in connection with the prism-based measurement system 10, so that only the differences with the above-described electronics unit are discussed.

As discussed above, control electronics unit 38, rather than being a prism driver 38, is now a EO-unit voltage source 38 adapted to provide variable voltage signals $S_{42A}$ and $S_{42B}$ to EO units 328A and 328B, respectively. EO-unit voltage source 38 is electrically coupled to microcontroller 270, as is user input device 230.

The operation of electronics unit 30 is also similar to that described above in connection with prism-based measurement system 10, so that only the differences are described here. The main difference is that microcontroller 270 is adapted (e.g., programmed) to control EO-voltage source 38 so that it provides the necessary voltages $V_A$ and $V_B$ for sweeping $\Delta$OPL to perform the autocorrelation of input pulse $P_0$. Rather than recording the position of prism stage 70, microcontroller 270 records the values for voltages $V_A$ and $V_B$ provided by EO-unit voltage source 38 over a range of voltage values, and correlates these values with the corresponding values for $\Delta$OPL. Microcontroller 270 is adapted (e.g., programmed) to calculate the pulse length $\tau_0$ of input pulse $P_0$ based on the voltage values (or the value of $\Delta$OPL), and the number of peaks $N_C$ in signal $S_A$ as represented by digital count signal $S_C$. This calculation is described below. After each sweep of $\Delta$OPL over a select range, microcontroller 270 generates a calculated pulse length signal $S_{PL}$ representative of pulse length $\tau_0$ and sends this signal to display 40 to display the calculated pulse length. Microcontroller 270 also sends a reset signal $S_{RES}$ to digital logic counter 260 that resets the digital logic counter to zero after each sweep over the select range of $\Delta$OPL so that the next input pulse $P_0$ can be measured.

e) Pulse Length Calculation

To calculate the pulse length $\tau_0$, the values for $\Delta$OPL must be known. In an example embodiment, an estimate of the range for pulse length $\tau_0$ is inputted (e.g., via user input unit 230) into microcontroller 270. This narrows the needed range for voltages $V_A$ and $V_B$, which in turn narrows the range of autocorrelation signal $S_A$.

For short pulses $P_0$, only a $\Delta$OPL is required because the autocorrelation trace is small. By making $\Delta$OPL greater than necessary, the possibility of reading noise increases.

Consider a Gaussian linearly chirped input pulse having the following expression:

$$E = \exp(-(1+ia)(t/\tau_G)^2)$$

where a is the linear chirp parameter and $\tau_G$ is the width of the pulse. The autocorrelation, as detected by the detector is given by:

$$G_2(\tau) = 1 + 2\exp(-(t/\tau_G)^2) + 4(\exp(-(a^2+3)/4*(t/\tau_G)^2))\cos(a/2*(t/\tau_G)^2)*\cos(\omega\tau) + 2(\exp(-(1+a^2)(t/\tau_G)^2))\cos(2\omega\tau)$$

(from Diels "Ultrashort laser pulse phenomena"), where $\omega$ refers to the variation of the function $G_2(\tau)$ as a function of its argument $\tau$. The pulse measurement is obtained by the method described for the prism setup. Count the number of peaks and retrieve the pulse duration from there. Notice that $\tau$ in that case is a function of voltage: $\tau = (2d/c)*(1/2n^3rV/l)$, where c is the speed of light, r is the EO coefficient, n is the refractive index of the EO member, l is the width of the EO member as seen by the applied electric field, d is the length of the EO modulator seen by the light, and V is the applied voltage.

IV. Pulse-Width Accuracy

The accuracy of light-pulse measurement system 10 depends on how close the reference level $L_{TH}$ follows the FWHM of the autocorrelation. If the reference level $L_{TH}$ is higher than the FWHM level, then the measured pulse length will be shorter than the actual, and vice versa for lower reference levels. In an example embodiment, the reference FWHM level is set by hand using an oscilloscope to measure the autocorrelation trace. This can be accomplished easily with electronics by finding the peak value and the base of the trace, dividing by two, and setting the reference level at that voltage.

Aside from the FWHM level, there will sometimes be a small deviation of one or two fringes in signal $S_A$ between pulses $P_0$. This small amount of shifting is equivalent to about 3 femtoseconds, which can be due to the actual differences in light pulses $P_0$ due to the light source 22 rather than measurement system 10. For most applications, this amount of error is negligible. The EO-based measurement system and the prism-based measurement system of the present invention will generally have similar accuracy since the system accuracy determined mainly by the measurement electronics.

V. System Alignment a) Prism-Based Measurement System

The repeatability of prism-based measurement system 10 is as good as any other similar commercial measurement system. Every time the system is moved, the input laser beam needs to be re-aligned to LED detector 32. Depending on the quality of the alignment, this can affect the performance of the system. System 10 preferably has at least two pre-set alignment points (e.g., a set of irises) that when aligned, ensure that the system makes accurate measurements. Ultimately, overall repeatability and accuracy is up to the end user's ability to align the system. The prism-based measurement system of the present invention, however, is much easier to align than other commercial systems.

The prism-based measurement system of the present invention is simple to align, beam-shape independent, and inexpensive to manufacture. The most expensive item needed for its construction is the Wollaston prism, which typically ranges from $500-1000. Each prism has a specific pulse length range. A prism with a deviation angle $\theta = 15°$ can measure pulses from 10 fs to 500 fs. Most measurements systems, such as the FROG system mentioned above, cannot cover this wide of a range. In addition, by changing the prism, the measurement range can be changed. Thus, an example embodiment of the prism-based measurement system includes having two or more prisms with different deviation angles inside the unit. The prisms are then automatically or manually placed into the operating position as needed, depending on the required measurement range.

a) EO-Based Measurement System

A preferred embodiment of the EO-based measurement system of the present invention is the integrated optical (IO) embodiment. The IO embodiment does not need to be aligned after its construction. Since it is waveguide based, there is preferably an optical system adapted to couple the light pulse into the waveguide. Accordingly, system alignment is straightforward as compared to the prism-based measurement system.

COMMERCIAL UTILITY

The systems and methods of the present invention should find great commercial utility in quickly and inexpensively measuring ultra-short light pulses for a variety of scientific and industrial applications that require characterizing an otherwise uncharacterized or uncertain output (i.e., the pulse length) of a laser light source.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A system for measuring a pulse length $\tau_0$ of an ultra-short light pulse $P_0$, comprising:
   a) an autocorrelation optical system adapted to receive a number of substantially similar light pulses $P_0$ and create from each light pulse two co-polarized beams having an associated optical path length difference $\Delta OPL$ that varies between light pulses to form an autocorrelation interference pattern representative of an autocorrelation of the light pulse;
   b) an LED detector adapted to detect the autocorrelation interference pattern and generate therefrom a raw autocorrelation signal $S_{AR}$;
   c) a signal-processing unit electrically coupled to the LED detector and adapted to form from the raw autocorrelation signal $S_{AR}$ a digital count signal $S_N$ representative of a number $N_C$ of counted peaks in the autocorrelation signals above the full-width half-maximum (FWHM);
   d) control electronics unit operably coupled to the autocorrelation optical system and the signal-processing unit and adapted to cause the varying $\Delta OPL$ and to provide a difference signal $S_\Delta$ representative of the $\Delta OPL$ to the signal-processing unit; and
   e) wherein the signal-processing unit is adapted to calculate the pulse length based on $\Delta OPL$ and $N_C$.

2. The system of claim 1, wherein light pulses $P_0$ are generated by a laser, and including an input optical system optically coupled to the laser and the autocorrelation optical system to provide the light pulse to the correlation optical system.

3. The system of claim 1, including a power supply electrically connected to the electronics unit so as to power the electronics unit.

4. The system of claim 1, wherein the electronics unit includes or is electrically coupled to a display adapted to display the pulse length measurement.

5. The system of claim 1, wherein the LED detector is supported by a movable stage.

6. The system of claim 1, wherein the signal-processing unit includes a microcontroller.

7. The system of claim 1, wherein the signal-processing unit includes:
   signal conditioning electronics adapted to amplify and filter the raw autocorrelation signal $S_{AR}$ to form a conditioned autocorrelation signal $S_{AC}$ that is used to form the digital count signal $S_N$.

8. The system of claim 7, including:
   a first analog buffer electrically coupled to the conditioning electronics and adapted to store the conditioned autocorrelation signal $S_{AC}$;
   a reference input unit electrically coupled to the conditioning electronics and adapted to receive the conditioned autocorrelation signal and provide a reference signal $S_R$ representative of the full-width half-maximum (FWHM) of the conditioned autocorrelation signal $S_{AC}$;
   a programmable comparator that receives the conditioned autocorrelation signal $S_{AC}$, and the reference signal $S_R$ and outputs digital logic levels for that portion of the conditioned autocorrelation signal $S_{AC}$ above the FWHM;
   a digital logic counter that receives the digital logic levels and generates the digital count signal $S_N$.

9. The system of claim 8, wherein the signal-processing unit includes a microcontroller electrically coupled to the digital logic counter and to the control electronics unit so as to control the control electronics unit and to receive the difference signal $S_\Delta$.

10. The system of claim 1, wherein the autocorrelation optical system includes, in order along an optical axis:
    a half-wave plate arranged to provide 45° polarization rotation of the incident pulse;
    a first lens arranged to receive the polarized-rotated light;
    a Wollaston prism that forms the two beams from the incident pulse, the two beams being orthogonally polarized, the prism being operably coupled to the control electronics unit and moveable thereby in a direction perpendicular to the optical axis to change the $\Delta OPL$ between the two beams so as to form a varying autocorrelation interference pattern;
    a second lens arranged to receive the two beams and focus them onto the LED detector; and
    a linear polarizer arranged so as to make the two beams co-polarized so that they interfere at the LED detector.

11. The system of claim 1, wherein the autocorrelation optical system includes:
    a first interferometer arm having an optical path length $OPL_A$ and that includes a first electro-optical (EO) unit electrically coupled to the control electronics unit and having at least one first EO member adapted to cause a change in $OPL_A$ in response to a first variable voltage signal provided by the control electronics unit;
    a second interferometer arm optically coupled to the first interferometer arm and having an optical path length $OPL_B$ and that includes a second electro-optical (EO) unit electrically coupled to the control electronics unit and having at least one second EO member adapted to cause a change in $OPL_B$ in response to a second variable voltage signal provided by the control electronics unit; and
    wherein $\Delta OPL=(OPL_A-OPL_B)$ and wherein $\Delta OPL$ varies in response to the control electronics unit varying the first and second variable voltage signals.

12. The system of claim 11, wherein the first and second EO units include a plurality of EO members.

13. The system of claim 11, wherein each interferometer arm includes a mirror and a beamsplitter.

14. The system of claim 11, wherein each interferometer arm includes an optical waveguide.

15. The system of claim 14, wherein each optical waveguide is an optical fiber.

16. The system of claim 14, wherein each optical waveguide is formed in or on a substrate.

17. The system of claim 16, wherein the substrate is formed from silicon.

18. The system of claim 14, including:
    an input waveguide that has an input end and that is optically coupled to both interferometer arms via a 3 dB splitter;
    a fiber-optic coupler provided at the input waveguide input end; and
    an input optical fiber optically coupled to the fiber-optical coupler and that carries the light pulse to be measured.

19. The system of claim 11, wherein the interferometer arms are joined at first and second ends via 3 dB splitters.

20. The system of claim 11, wherein one or more of the at least one first EO member and at least one second EO member is made of a crystal selected from the group of crystals comprising: $Li_2NO_3O$, $BaTiO_3$, $KNbO_3$ and $KTa_{0.35}NB_{0.65}O_3$.

21. A method of measuring a length of an ultra-short light pulse, comprising:
    providing a number of substantially similar light pulses $P_0$;
    dividing each light pulse $P_0$ into two co-polarized light beams having a different optical path length difference $\Delta OPL$ for each light pulse $P_0$;

interfering the two light beams for each inputted light pulse to form an autocorrelation interference pattern representative of the autocorrelation of the light pulse;

using an LED detector to convert the autocorrelation interference pattern into an autocorrelation signal $S_A$;

measuring the autocorrelation signal $S_A$ to determine a full-width half-max (FWHM) threshold $L_{TH}$;

using a programmable comparator and a digital logic counter to count a number $N_C$ of peaks in the autocorrelation signal $S_A$ that are above the full-width half-max (FWHM) based on the FWHM threshold $L_{TH}$; and using a microcontroller to calculate the pulse length based on $\Delta OPL$ and $N_C$.

22. The method of claim 21, including changing the $\Delta OPL$ using a Wollaston prism.

23. The method of claim 21, including changing the $\Delta OPL$ using an interferometer having first and second arms and varying first and second optical path lengths associated with the respective first and second arms using at least one electro-optical (EO) member in each arm.

24. The method of claim 21, including providing variable voltage signals to said at least one EO member in each of the first and second arms.

25. The method of claim 21, including forming a digital count signal representative of the number $N_C$ of counted peaks and providing the digital count signal to the microcontroller.

26. The method of claim 21, including conditioning the autocorrelation signal by:

filtering and amplifying the autocorrelation signal to form a conditioned autocorrelation signal; and storing the conditioned autocorrelation signal in a first buffer so as to isolate the LED detector from other electronic elements.

27. The method of claim 26, including providing the conditioned autocorrelation signal and a reference signal representative of FWHM threshold level $L_{TH}$ to the programmable comparator, and outputting from the comparator digital logic levels for that portion of the conditioned autocorrelation signal above the FWHM, and inputting the digital logic levels into the digital logic counter.

28. The method of claim 21, including resetting the digital comparator prior to performing another pulse length measurement.

29. The method of claim 21, including:

providing the light pulses $P_0$ from a laser having an uncertain characterization of the pulse length of the light pulses; and using the measured pulse length to characterize the laser pulse length output.

* * * * *